United States Patent [19]

Dickerson et al.

[11] Patent Number: 5,058,997

[45] Date of Patent: Oct. 22, 1991

[54] TFT LCD WITH OPTICAL INTERFERENCE COLOR FILTERS

[75] Inventors: Jack A. Dickerson, Raleigh; Neil M. Poley, Cary, both of N.C.

[73] Assignee: International Business Machines Corporation, Armonk, N.Y.

[21] Appl. No.: 392,818

[22] Filed: Aug. 11, 1989

[51] Int. Cl.$^5$ ............................................. G02F 1/13
[52] U.S. Cl. ........................................ 359/59; 359/68
[58] Field of Search .................. 350/339 F, 336, 334, 350/311; 357/4, 23.7

[56] References Cited

U.S. PATENT DOCUMENTS

| | | | |
|---|---|---|---|
| 4,470,666 | 9/1984 | Eick | 350/339 F |
| 4,522,691 | 6/1985 | Suginoya et al. | 204/18.1 |
| 4,600,274 | 7/1986 | Morozumi | 350/339 F |
| 4,639,088 | 1/1987 | Suginoya et al. | 350/339 F |
| 4,673,253 | 6/1987 | Tanabe | 350/339 F |
| 4,690,511 | 9/1987 | Watanabe | 350/339 F |
| 4,709,993 | 11/1987 | Matsuyama et al. | 350/339 F |
| 4,714,636 | 12/1987 | Yokono et al. | 350/339 F |
| 4,743,098 | 5/1988 | Dickerson et al. | 350/339 F |
| 4,743,099 | 5/1988 | Dickerson et al. | 350/339 F |
| 4,744,637 | 5/1988 | Sekimura et al. | 350/339 F |
| 4,776,673 | 10/1988 | Aoki et al. | 350/339 F |
| 4,786,148 | 11/1988 | Sekimura et al. | 350/339 F |
| 4,988,168 | 1/1991 | Dickerson et al. | 350/339 F |

FOREIGN PATENT DOCUMENTS

| | | | |
|---|---|---|---|
| 0296429 | 12/1988 | European Pat. Off. | 350/339 F |
| 0075820 | 4/1985 | Japan | 350/339 F |
| 0222822 | 11/1985 | Japan | 350/339 F |

Primary Examiner—Rolf Mille
Assistant Examiner—Tan Ho
Attorney, Agent, or Firm—Blaney Harper; Maurice H. Klitzman; Gerald R. Woods

[57] ABSTRACT

The invention is an improvement in a liquid crystal display device of the type having spaced front and rear glass panels, a transparent electrode layer, and an array of individually addressable pel electrodes separated from the transparent electrode layer by a cavity filled with liquid crystal material. The improvement comprises a color filter layer in the form of a decal pattern. The decal pattern is formed using interference film techniques which form an inorganic color filter. The decal is placed on one of the glass panels using known decal transfer methods. The inorganic nature of the color filter layer and the decal transfer methods allow for enhanced optical density of the color liquid crystal display.

18 Claims, 4 Drawing Sheets

TFT LCD WITH OPTICAL INTERFERENCE COLOR FILTERS

FIELD OF THE INVENTION

The present invention relates to liquid crystal displays and more particularly liquid crystal displays having color capabilities.

BACKGROUND OF THE INVENTION

Thin film transistor liquid crystal display (TFT LCD) technology has been developed as a successor to cathode ray tube technology for color display computer terminals. Liquid crystal displays with a given display screen area occupy a smaller volume than cathode ray tube devices with the same screen area. This is considered commercially significant, because the smaller liquid crystal display has a smaller footprint. That is, it occupies less area on a user's desk or terminal stand. Liquid crystal display devices may also have lower power requirements than corresponding cathode ray tube devices. This is because the operating voltages of liquid crystal devices are considerably lower than the operating voltages of cathode ray tube devices. These characteristics are not only desirable for computer terminals but are also desirable for televisions, video displays, and a variety of other electronic devices.

While different types of color liquid crystal display devices exist, such devices generally include two spaced panels which define a sealed cavity filled with a liquid crystal display material. A transparent common electrode is formed inside the defined cavity on one of the glass panels. Individual electrodes, also on the inside of the defined cavity, are formed on the other glass panel. Each of the individual electrodes has a surface area corresponding to the area of one, or part of one, picture element or pel. Each pel is too small to be easily seen by the unaided human eye. If the device is to have color capabilities, it must also include color filters with red, green, and blue color areas. Each color area is aligned with one of the electrodes. Each set of red, green, and blue color areas is grouped into a triad, repetitive stripes, or other consistent pattern within the pel.

In typical liquid crystal displays (LCDs), each of the individual electrodes can be addressed by means of a thin film transistor. Depending upon the image to be displayed, one or more of the pel electrodes is energized during the display operation to allow full light, no light, or partial light to be transmitted through the color filter area associated with the pel electrode. The image perceived by the user is a blending of colors formed by the transmission of light through adjacent color filter areas.

The display may be backlighted by locating a light source on the opposite side of the display, away from the viewer. Alternatively, the display may include a reflective layer at its rear surface and rely on the light source located on the same side of the display as the viewer.

Color filters for use on such devices have been fabricated using a number of different approaches. One approach has been to spin or deposit a light sensitized adhesive film onto the glass panel. The film is then patterned in three sequential steps. During each step, dye of a specific color is applied to the predetermined regions of the film. According to another approach, organic pigments are deposited by vacuum evaporation. These pigments are then patterned by conventional lift-off techniques. According to still another approach, a dyed and patterned stretched film material is used to create an internal color polarizing filter.

Each of these approaches has certain drawbacks. Most involve polymer deposition and photopatterning techniques which are relatively expensive and difficult to perform with the necessary precision. This is especially true when the devices are manufactured on a volume basis. Also, each creates a color filter film which is located between the transparent common electrode and the individually addressable pel electrodes (referred to as the gap of the device). To increase optical density (or color intensity) of color filters made by the above described approaches, the thickness of the color filter film may be increased. However, increasing the filter film thickness also increases the spacing between the transparent common electrode and the individually addressable pel electrodes. The increased spacing causes the gap and associated LCD thickness to be more nonuniform which results in nonuniform electrical characteristics of the LCD.

One of the major problems with the approaches described above is the difficulty of maintaining registration or alignment between the pel electrodes and the color regions in the color filter layer. The prior art color filters are composed of organic materials which require processing on the glass panel itself. The organic materials are not stable at high temperatures. This means that the Thin Film Transistors (TFT) must be formed prior to, or separate from, the color film deposition. Misregistration problems occur in either case, because when the two films are made separately and brought together, the error in joining the transistors to the filters may be large compared to the pel size. Also, when the TFT is made before the color film, the color film has to be printed and dyed on the pel so that the color film position compensates for the TFT activated light transmission. Forming the TFT before the color filter or forming it separately from the color filter exacerbates already difficult registration problems because of the organic nature of the filter.

Still another approach to making TFT LCDs uses photosensitive emulsion layers. A liquid crystal shutter device is used to sequentially expose predetermined areas of the photosensitive emulsion layers while the layers are flooded with light having the specific color. Three differently colored regions are formed by sequentially energizing three different groups of pel electrodes through associated thin film transistors. The latent images produced in the photosensitive emulsion layer are developed and the film is laminated to a glass substrate to form a multicolored filter.

While the use of photosensitive emulsion layers simplifies registration or alignment problems, it nevertheless retains the drawbacks of some of the other approaches discussed earlier. Multiple exposure operations to different colors of light are required along with a step of laminating photosensitive emulsion layers to a glass substrate. The number of steps and the relative complexity of the those steps necessarily must be reflected in the product cost.

OBJECTS OF THE INVENTION

It is the object of the claimed invention to provide a thin film transistor liquid crystal display (TFT LCD) with improved color display capabilities.

It is a further object of the claimed invention to provide a color TFT LCD with greater optical density and lower voltage requirements than heretofore obtained through increased alignment accuracy between the color filters and the pel electrodes.

It is still a further object of the claimed invention to provide a color TFT LCD with improved alignment accuracy between the color filters and the pel electrodes by aligning the pel electrodes directly onto the color filters.

It is still a further object of this invention to provide an improved method of making a TFT LCD with color capability in which interference film color filters are laminated to a transparent plate of the TFT LCD.

SUMMARY OF THE INVENTION

The present invention is an improved thin film transistor liquid crystal display with color capabilities. Interference film and printing technology are employed in the fabrication of the display to simplify the task of aligning pel electrodes with associated color regions in the color filter layer. This liquid crystal display device is of the type having spaced front and rear glass panels, a transparent electrode layer, and an array of individually addressable pel electrodes separated from the transparent electrode layer by a cavity filled with liquid crystal material. The improvement comprises a color filter layer comprised of an array of interference films. The filter layer is an array of color filters formed by printing a pattern in sensitized adhesive on a glass panel and selectively transferring interference color films to the adhesive pattern. The color filters fabricated with interference film techniques can be produced to a high resolution, do not require processing of the filter itself on the glass, and are stable at high temperatures. Therefore, less difficulty is expected in achieving volume production registration between the color regions in the color filter layer and the pel electrodes. Additionally, the color filter may be processed with any desired uniform hue and intensity without affecting the registration fo the filters to the pel electrodes.

BRIEF DESCRIPTION OF THE DRAWINGS

While the specification concludes with claims particularly pointing out and distinctly claiming that which is regarded as the present invention, details of the preferred embodiments of the invention may be more readily ascertained from the following technical description when read in conjunction with the accompanying drawings wherein:

PREFERRED EMBODIMENTS

Figure 1:
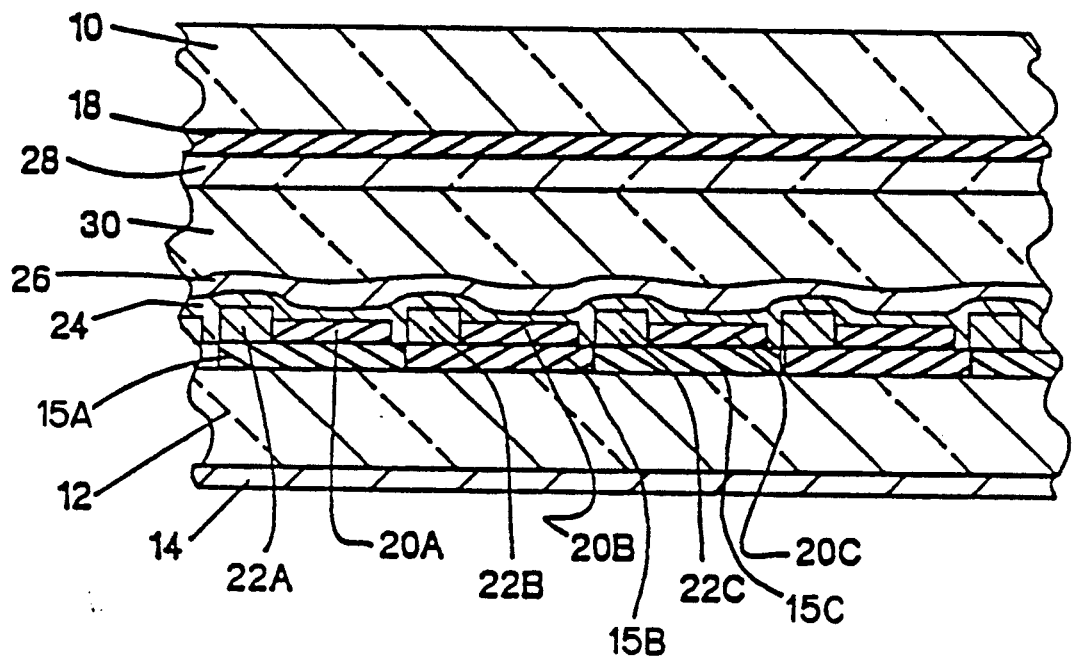
FIG. 1 is a partial cross section of a preferred embodiment of a thin film transistor liquid crystal display device made in accordance with the present invention.

FIG. 1 is a partial cross section of a thin film transistor liquid crystal display which can be fabricated in accordance with the present invention. The display includes two transparent plates, 10 and 12, which are typically glass panels, a polarizing filter 14, a transparent common electrode 18, and a plurality of individually addressable pel electrodes 20A, 20B, 20C, etc. The pel electrodes may be individually addressed or energized through associated thin film transistors 22A, 22B, 22C, etc. The pel electrodes and thin film transistors are deposited directly on the filter layer with color elements 15A 15B, and 15C, details of which are provided below. The pel electrodes and thin film transistors are covered by a layer of insulating material 24, which is in turn, covered by an alignment film 26. A second alignment film 28 is deposited on the transparent common electrode 18. The space between the alignment films 26 and 28 is a cavity 30 which is filled with a liquid crystal material. The glass plates, 10 and 12, define another cavity in which the LCD material with the alignment films 26 and 28 in combination with the pel electrodes and the thin film transistors are placed. The polarizing filter is typically attached to one of the glass plates.

Most of the components described above are conventional and are fabricated using known techniques. However, the color filter layer is unique in that it is an interference film made of an inorganic material and transferred to a glass panel 12 using film transfer technology. This allows thin film transistors to be directly placed on the color filters to reduce registration errors. The interference film is formed on a substrate which is a flexible membrane, usually plastic, that has been coated with a releasable layer so that the membrane can be separated from the interference film. The substrate, formed by the membrane being coated with the releasable layer, is typically manufactured on a continuous basis in a vacuum roll coating machine. In the present invention the interference film is comprised of layers of thin film dielectric and metal materials. These dielectric and metal materials are blanket deposited on the substrate in the form of a Fabry Perot Optical Interference filter with the spacer layer thickness of the filter adjusted to provide the particular color desired for one of the electrodes.

Design of such optical interference filters is common in the optics industry. The filters can be fabricated from a variety of refractory inorganic evaporated or sputtered thin films. The filter typically consists of three layers, a second layer interposed between a first and third layer. The first and third layers are highly reflecting, slightly transmitting films such as silver. The second or spacer layer is a dielectric layer, such as zinc-sulfide (ZnS). The thickness of the spacer layer determines the wavelength of the output light and hence the color. High index of refraction dielectric spacer layers are normally used to reduce the dependency of the transmission wavelength on the incidence angle of light. To ensure that the transmitted light has a narrow pass band and that there is minimum transmission outside of the pass band frequency range, the reflecting layers should have reflectivity close to unity. The reflecting layers can be made of dielectric films, similar to the spacer layer, because reflectivity of a layer is increased when a medium of high index of refraction has embedded within it a film of low index of refraction. Therefore, high reflectivity films can be made from alternating layers of low and high index of refraction dielectrics. The result of this is that alternating layers of materials such as titanium dioxide and silicon dioxide can be used to manufacture the entire filter.

The groups of dielectric and metal layers are deposited on a releasable layer to form the individual color filters associated with the pel array. Each repeatable segment of the pel array has three color filters associated with it. A first filter that corresponds to a first part of the pel array and to one color, is deposited on a first substrate. A second filter that corresponds to a second part of the pel array and to a second color, is deposited on a second substrate. Similarly, a third filter that corresponds to a third part of the pel array and to a third color, is deposited on a third substrate.

A pattern of adhesive that corresponds to the pattern of filters of one color is then applied to the glass member 12. A number of adhesives are practical for use in this invention and are also well known, such as, heat activated adhesives, ultraviolet light initiated adhesives, or optical cements. The adhesive is patterned by printing or conventional photolithographic techniques. An interference film capable of producing the one color and having a releasable substrate backing is then laminated to the glass member by the adhesive. The adhesive is cured, and the flexible membrane substrate is then physically peeled away or separated from the color filters. This physical separation has two results. First, the substrate backing peels away from the interference film in the area of the interference film which is laminated onto the glass member 12 by the adhesive. Second, in the area where the adhesive did not secure the interference film to the glass substrate, the interference film remains on the substrate backing. In this area, the physical peeling away or separation breaks the interference film adhering to the substrate backing away from the interference film adhering to the glass member 12. The releasable film adheres to the interference film strongly enough so that the interference film itself will break before the releasable film will release the interference film from the substrate backing. Additionally, the releasable film will be weaker than the adhesive securing the interference film to the glass member 12. This results in the substrate backing peeling away from the interference film without the interference film being pulled from the surface of the glass member 12.

Figure 4:
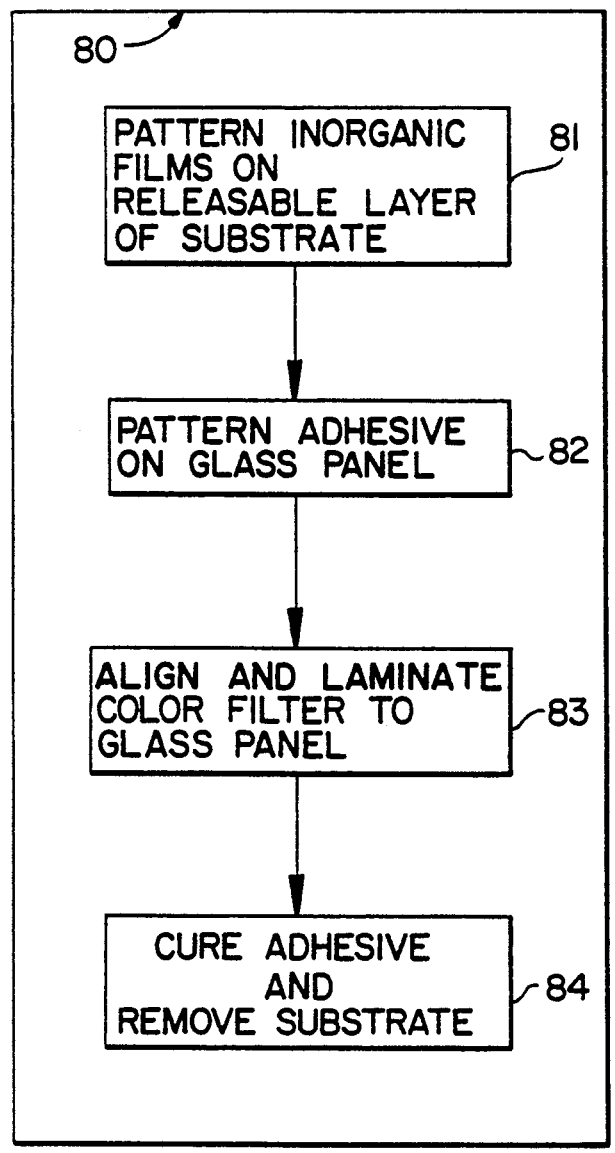
FIG. 4 is a block diagram of steps performed in forming the color filter layer for the disclosed devices.

This physical separation leaves a first pattern of inorganic color filters on the glass member. This process is illustrated in FIG. 4. The Transfer Color Filter Layer to Glass Panel process 80 includes the patterning of one color inorganic films on the releasable layer of the substrate 81, patterning the adhesive on the glass panel 82, aligning and laminating the color filter to the glass panel 83, and removing the substrate 84. The transfer process 80 of laminating the color filters to the glass member is used two more times to laminate second and third colors to the glass panel along with the first color. The process is repeated with the second and third patterned adhesive layers and second and third interference films on releasable substrates. Each substrate places one color filter within each repeatable segment of the pel array on the glass member. The location of each color filter is determined by the location of the printed adhesive. The resulting color filter pattern is shown in FIG. 1 and comprises elements 15A, 15B, and 15C.

The ability to make small patterns of adhesive through printing or conventional lithography is especially useful in reducing the size of the color filter to approximately that of the TFT and pel electrode. This is because once the filter is in place on the glass, the transistor and electrode fabrication, which is always much more dimensionally accurate than the color filter fabrication, will be aligned to the color filter. The alignment order is inverted from the conventional order of aligning the filter to the transistors and electrodes. This alignment is facilitated by alignment marks fabricated on the glass member from the interference film transfer process. Since the filter itself is dimensionally accurate and stable (with respect to heat and other processing) because of its inorganic nature, the color filter size can be correspondingly reduced with the ability to pattern the adhesive.

Figure 2:
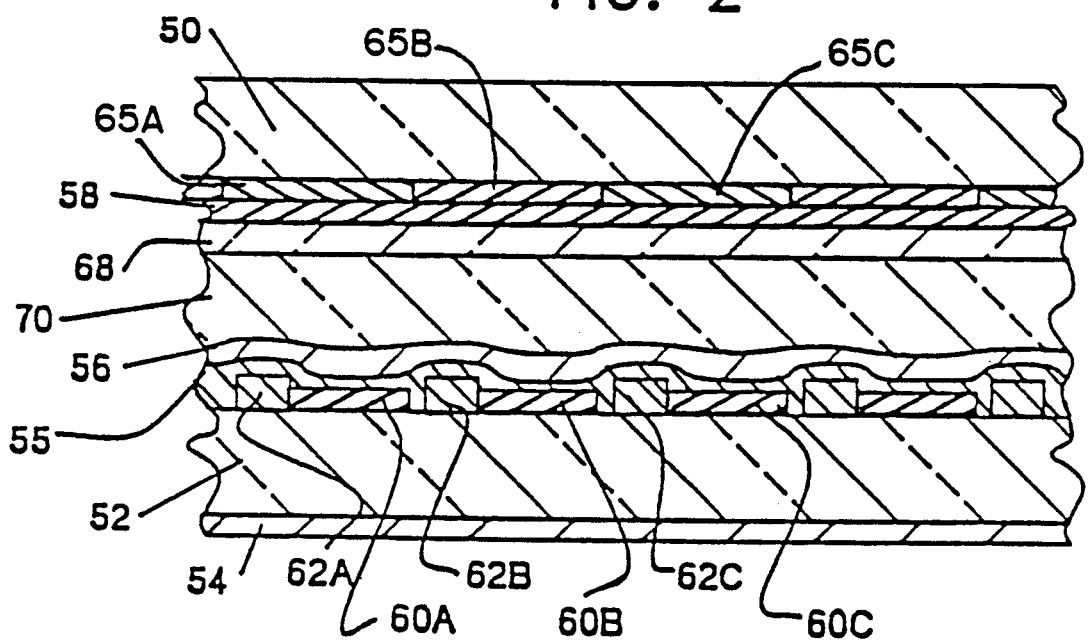
FIG. 2 is a partial cross section of an alternative embodiment of a thin film transistor liquid crystal display device made in accordance with the present invention.

An alternative embodiment of the invention is shown in FIG. 2. The alternative embodiment includes basically the same components as the embodiment shown in FIG. 1, but the color filter layer is located in a different place. More specifically, the device shown in FIG. 2 has a transparent front plate 50 which is typically glass, a transparent rear plate 52 also typically glass, a polarizing filter 54, a transparent common electrode layer 58, and an array of individually addressable pel electrodes, 60A, 60B, and 60C etc., with associated thin film transistors 62A, 62B, and 62C, etc. The pel electrodes and thin film transistors are coated with a layer 55 of insulating material. An alignment film 56 covers the insulating layer 55. A second alignment film 68 is deposited on the common electrode layer 58. The alignment films define the cavity 70 which contains the liquid crystal material.

The filter layer comprising filter elements 65A, 65B, and 65C, etc. is applied to the front glass panel 50 beneath the common electrode layer 58. This embodiment does not take advantage of the alignment improvements of the embodiment in FIG. 1 because the transistors are not aligned to and placed on the color filter already in place. However, the nature of the color filter material allows it to be used in configurations such as FIG. 2 which still allows for better dimensional accuracy of the color filter. In addition, the relative positions of the color filter layer and the common electrode layer 58 can be interchanged.

Figure 3:
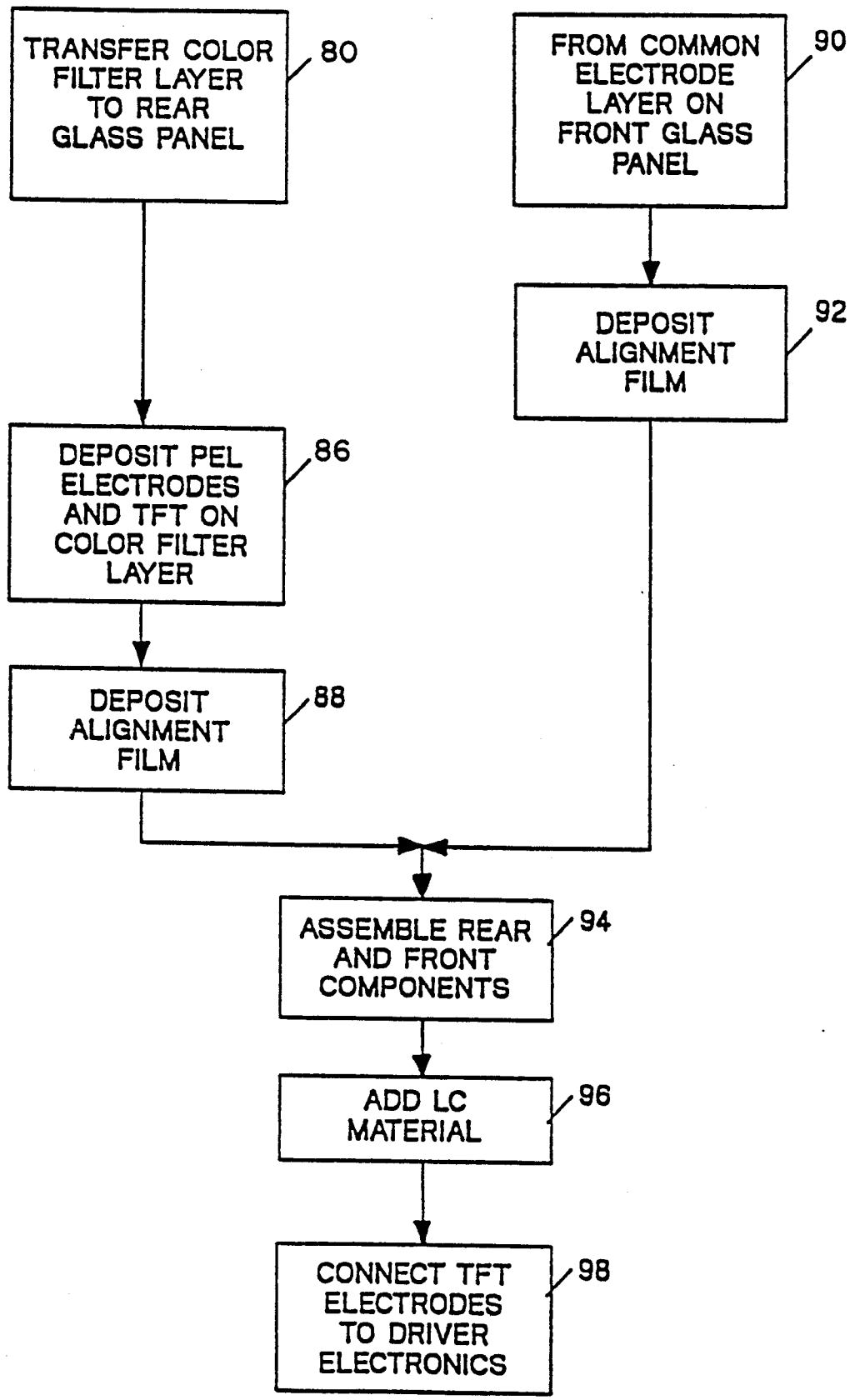
FIG. 3 is a block diagram of specific steps required in producing the device shown in FIG. 1.

FIG. 3 generally illustrates the specific operations that must be carried out in fabricating the device shown in FIG. 1. Referring to FIG. 3, separate and independent operations are used to form the subassemblies associated with the front and rear glass panels. In forming the rear glass panel subassembly, color filters are transferred to the rear glass panel and are permanently fixed in place by the transfer process 80. The transfer process 80, described earlier and detailed in FIG. 4, is repeated once for each color used in the color filter array, which is typically three times. Once the color filters are in place, the pel electrodes and thin film transistors can be deposited 86 directly on the color filter layer. The alignment film is then deposited 88 to complete the rear glass panel subassembly.

The front glass panel subassembly is fabricated separately from the rear glass panel subassembly. The common electrode layer for the display device is formed on the front glass panel 90 and is covered by another alignment film to complete the front glass panel subassembly. The front and rear subassemblies are then aligned and assembled 94 with respect to each other, forming a cavity for the liquid crystal display material. The liquid crystal display material is then added and the cavity sealed 96. The driver electronics are subsequently connected to the TFT electrodes 98 and the display screen is complete.

Figure 5:
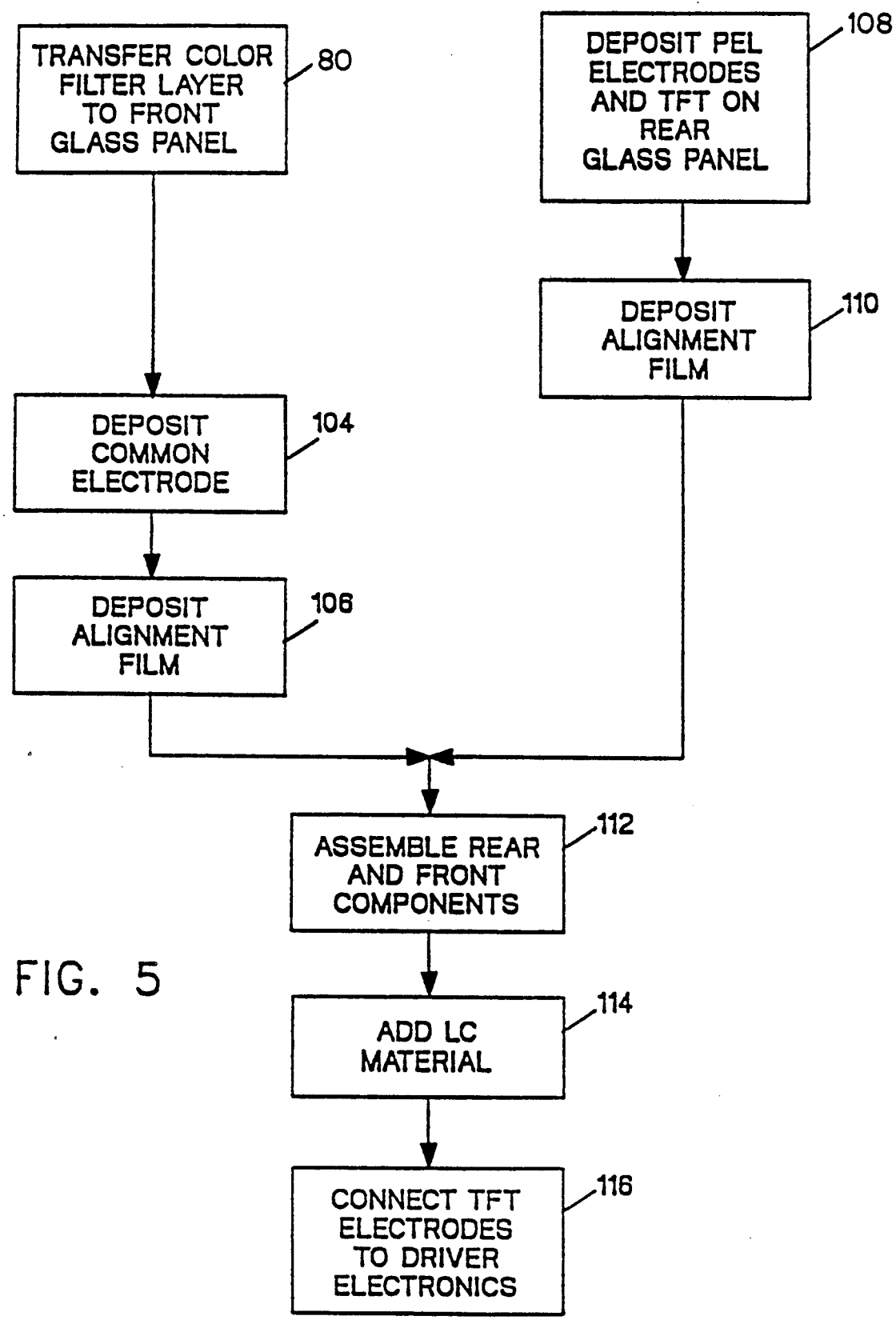
FIG. 5 is a block diagram of specific steps required in producing the device shown in FIG. 2.

The alternative embodiment of the display device, illustrated in FIG. 2, is fabricated according to the steps shown in FIG. 5. The color filter layer is transferred 80 (given in more detail in FIG. 4) to the front glass panel 50. The transparent common electrode layer 58 is then deposited 104 over the color filter layer. Finally an alignment film 68 is placed 106 over the combination of the color filter film and the common electrode layer.

The rear glass panel 52 has pel electrodes and TFTs deposited directly on it 108. This combination is then covered 110 with another alignment film 56. The front and rear glass panels are then aligned and assembled with respect to each other 112 forming a cavity 70 for the liquid crystal display material. The liquid crystal display material is then added and the cavity sealed 114. The driver electronics are subsequently connected 116 to the TFTs and electrodes to complete the display screen.

While there have been described what are considered to be the preferred embodiments of the invention, variations and modifications thereof will occur to those skilled in the art. Therefore it is intended that the appended claims shall be construed to include the preferred embodiments and all such variations and modifications in form or detail that fall within the spirit and scope of the invention.

We claim:

1. A color liquid crystal display device comprising:
   two transparent plates defining a cavity, said cavity having a layer of liquid crystal material interposed between a common electrode layer and a plurality of pel electrodes;
   each of said plurality of pel electrodes having a corresponding thin film transistor and an inorganic color filter element; and
   said inorganic color filter element having a spacer layer interposed between two reflecting layers.

2. A color liquid crystal display device as in claim 1 wherein:
   each of said inorganic color filter elements contacts said corresponding thin film transistor and said corresponding pel electrode.

3. A color liquid crystal display device as in claim 1 wherein:
   each of said inorganic color filter elements contacts said common electrode layer.

4. A color liquid crystal display device, as in claim 1, wherein:
   each of said reflecting layers comprises at least three dielectric films, a first dielectric film having a low index of refraction and a second and third dielectric film having a high index of refraction, said first dielectric film interposed between said second and third dielectric films.

5. A color liquid crystal display device, as in claim 4, wherein:
   each of said inorganic color filter elements contacts said corresponding thin film transistor and said corresponding pel electrode.

6. A color liquid crystal display device, as in claim 4, wherein:
   each of said inorganic color filter elements contacts said common electrode layer.

7. A color liquid crystal display device, as in claim 1, wherein:
   each of said reflecting layers comprises alternating high and low index of refraction dielectric layers.

8. A color liquid crystal display device, as in claim 7, wherein:
   each of said inorganic color filter elements contacts said corresponding thin film transistor and said corresponding pel electrode.

9. A color liquid crystal display device, as in claim 7, wherein:
   each of said inorganic color filter elements contacts said common electrode layer.

10. A color liquid crystal display device, as in claim 1, wherein:
    said spacer layer has a high index of refraction; and
    said spacer layer thickness determines the color of said color filter element.

11. A color liquid crystal display device, as in claim 10, wherein:
    each of said inorganic color filter elements contacts said corresponding thin film transistor and said corresponding pel electrode.

12. A color liquid crystal display device, as in claim 10, wherein:
    each of said inorganic color filter elements contacts said common electrode layer.

13. A color liquid crystal display device, as in claim 10, wherein:
    each of said reflecting layers comprises at least three dielectric films, a first dielectric film having a low index of refraction and a second and third dielectric film having a high index of refraction, said first dielectric film interposed between said second and third dielectric films.

14. A color liquid crystal display device, as in claim 13, wherein:
    each of said inorganic color filter elements contacts said corresponding thin film transistor and said corresponding pel electrode.

15. A color liquid crystal display device, as in claim 13, wherein:
    each of said inorganic color filter elements contacts said common electrode layer.

16. A color liquid crystal display device, as in claim 10, wherein:
    each of said reflecting layers comprises alternating high and low index of refraction dielectric layers.

17. A color liquid crystal display device, as in claim 16, wherein:
    each of said inorganic color filter elements contacts said corresponding thin film transistor and said corresponding pel electrode.

18. A color liquid crystal display device, as in claim 16, wherein:
    each of said inorganic color filter element contacts said common electrode layer.

* * * * *